United States Patent [19]
Yamauchi

[11] 3,863,129
[45] Jan. 28, 1975

[54] BATTERY CHARGER

[76] Inventor: Hiroyuki Yamauchi, c/o Yokoi, 6-19 Takanawa 3-chome, Tokyo, Japan

[22] Filed: Feb. 16, 1973

[21] Appl. No.: 333,012

[30] Foreign Application Priority Data
Feb. 22, 1972 Japan.................................. 47-18251

[52] U.S. Cl.................. 320/31, 320/39, 320/DIG. 2, 321/10
[51] Int. Cl................................................ H02j 7/10
[58] Field of Search ............. 320/39, 40, 31, DIG. 2

[56] References Cited
UNITED STATES PATENTS

| | | |
|---|---|---|
| 3,531,706 | 9/1970 | Mullersman...................... 320/39 X |
| 3,576,487 | 12/1969 | Chase .................................. 320/39 |
| 3,748,568 | 7/1973 | Ackermann ..................... 320/39 X |

*Primary Examiner*—J. D. Miller
*Assistant Examiner*—Robert J. Hickey
*Attorney, Agent, or Firm*—Lewis H. Eslinger; Alvin Sinderbrand

[57] ABSTRACT

In a battery charger wherein a battery is charged by a pulsating current, a control circuit is provided for controlling the charging current of the battery in accordance with the result of an intermittent comparison of an open terminal voltage of the battery with a reference voltage at a period identical with that of the pulsating current. The reference voltage is varied in accordance with the charging condition of the battery by controlling the reference voltage in accordance with the detected AC component of the charging current.

4 Claims, 7 Drawing Figures

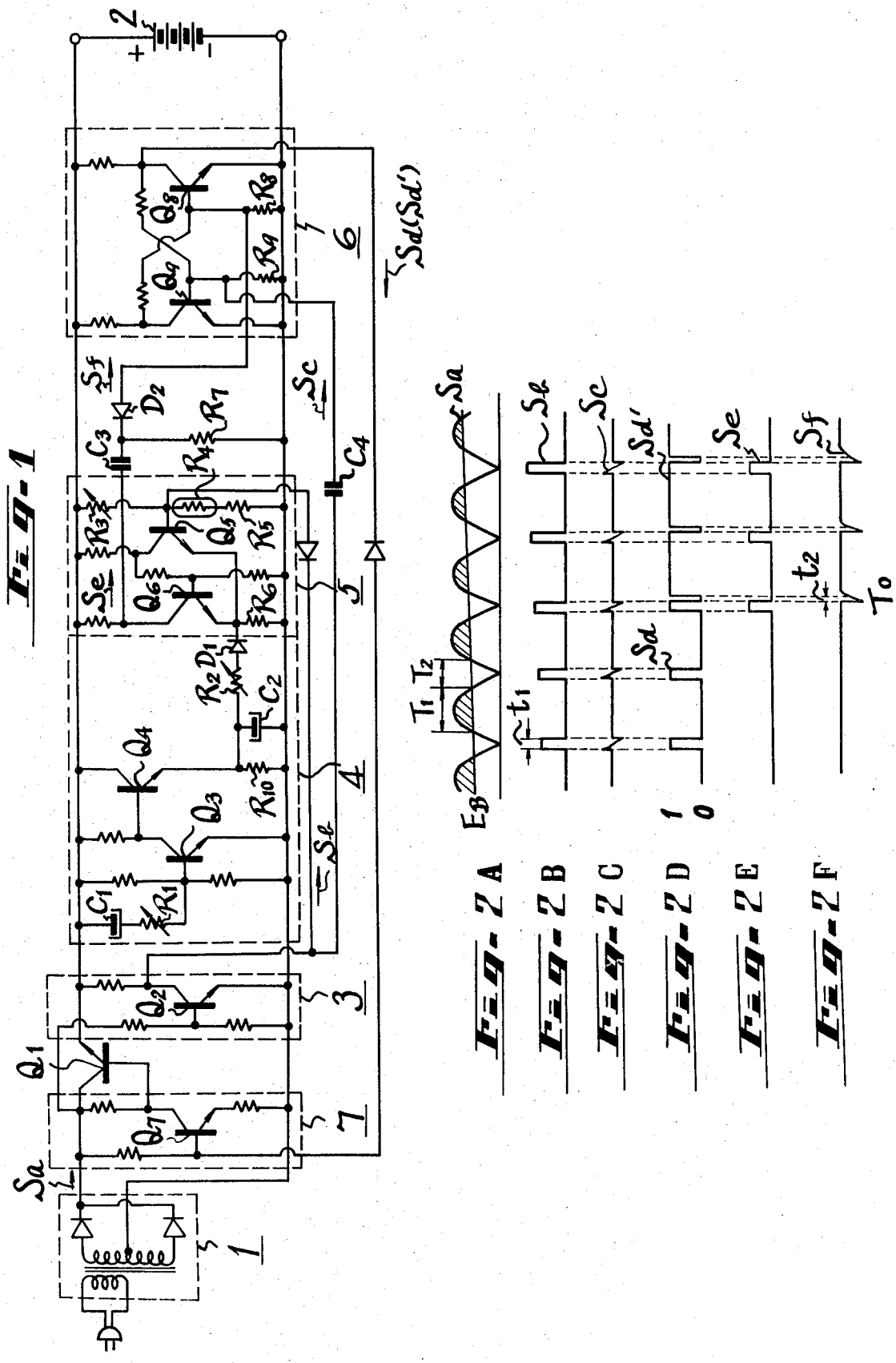

BATTERY CHARGER

BACKGROUND OF THE INVENTION

1. Field of the Invention

This invention relates generally to a battery charger, and more particularly to a control circuit for controlling the charging current of a battery.

2. Description of the Prior Art

It is known to enhance the charging efficiency of a battery charger by using a pulsating current as a power supply. It is also well known to measure or detect the terminal voltage of a battery during a non-charging period, that is, the so-called open terminal voltage, so as to detect the true charging condition of the battery. More specifically, it has been proposed that, in charging a battery, a pulsating current is supplied to the battery through a switching element and an open terminal voltage of the battery is compared with a reference voltage at every period of the pulsating current to control the switching element with the result that the charging current for the battery is controlled.

However, the above procedure for charging a battery has the following defect:

Generally speaking, when the charging of a battery stops, there is a tendency for the terminal voltage of the battery to decrease exponentially until it settles at the true terminal voltage. In fact, the time required for the measured terminal voltage of the battery to become the true terminal voltage is from 10 to 20 seconds after charging of the battery is stopped. Accordingly, in the case where the battery charging current is obtained by full-wave rectifying of a current from a 50Hz power supply, that is, the battery is charged by a pulsating current having a repetition frequency of 100 Hz, the measurement of the terminal voltage of the battery is carried out in a time period of about 1 milli-second immediately after each charging period and, therefore, the measured terminal voltage is relatively higher than the true terminal voltage of the battery. Accordingly, even though the battery is not charged sufficiently, the charging current for the battery is decreased in response to such measurement of the terminal voltage, and hence a relatively long time is required for sufficient charging of the battery.

If a reference voltage which is higher than a nominal voltage corresponding to full charging of the battery is employed in order to shorten the charging time of the battery, the following defect may occur. During initial charging of the battery no problem will arise; however, as charging of the battery continues, the use of a reference voltage higher than the aforesaid nominal voltage may cause the battery to be charged further after the battery is charged sufficiently, with the result that the battery is over-charged to produce gas, heat and so on, which are harmful to the battery. Particularly in the case of a nickel-cadmium battery which is sealed, the generation of heat and gas may cause the nickel-cadmium battery to explode.

SUMMARY OF THE INVENTION

It is an object of this invention to provide an improved battery charger.

Another object of this invention is to provide an improved battery charger for the relatively rapid charging of a battery using a pulsating current as a power supply therefor.

A further object is to provide an improved battery charger for charging a battery sufficiently by detecting an open terminal voltage of the battery.

Still another object is to provide a battery charger, as aforesaid, which prevents over-charging of the battery.

In accordance with an aspect of this invention, the charging current for charging a battery is derived from a pulsating current source and is controlled in accordance with the result of an intermittent comparison of the open terminal voltage of the battery with a reference voltage which is varied in correspondence to the charging condition of the battery as determined by detection of the AC component of the charging current.

BRIEF DESCRIPTION OF THE DRAWING

FIG. 1 is a schematic diagram of a battery charger in accordance with an embodiment of the invention; and FIGS. 2A to 2F are waveform diagrams to which reference will be made in explaining the operation of the battery charger of FIG. 1.

DESCRIPTION OF A PREFERRED EMBODIMENT

Referring to FIG. 1 in detail, it will be seen that the battery charger in accordance with this invention, as there shown, generally comprises a pulsating current power supply 1 which has connected thereto a switching element $Q_1$, such as, a semiconductor element in the form of a transistor, as shown, and a battery 2 in series. The terminal voltage of battery 2 is detected during each non-charging period of a pulsating current from power supply 1. Generally, in accordance with the invention, switching element $Q_1$ is made conductive during each charging period, only when the detected terminal voltage of battery 2 is lower than a reference voltage, and the switching element $Q_1$ is maintained in its non-conductive state, even during the charging period, when the detected terminal voltage is higher than the reference voltage. Further, the AC component of the charging current for the battery 2 is detected and the aforesaid reference voltage is varied in accordance with the detected AC component to achieve a quick charging of the battery 2, as hereinafter described in detail.

In the illustrated embodiment, an AC power source and an ordinary full wave rectifying circuit are employed as the pulsating current power supply 1 which supplies to the series circuit of switching element $Q_1$ and the battery 2 to be charged a pulsating voltage $S_a$ (FIG. 2A) obtained by full-wave rectifying the output from the AC power source. If it is assumed that the terminal voltage across battery 2 is $E_B$, a time period $T_1$ corresponding to the portion of each pulse of the pusating voltage $S_a$ above the terminal voltage $E_B$, which portion is shown hatched in FIG. 2A, is the charging period of the battery 2. During each time period $T_1$, charging current is applied to the battery 2, and the time period $T_2$ corresponding to the residual portion of each pulse of the pulsating voltage $S_a$ is a non-charging period. The time $(T_1+T_2)$ is, of course, the period of the pulsating voltage $S_a$.

In order to avoid the previously mentioned disadvantages of the known battery chargers, the reference signal which is compared with the terminal voltage of the battery for controlling the switching element $Q_1$ is set relatively high in the initial charging condition, that is, at the commencement of charging of battery 2, to supply a charging current of great magnitude to the battery, and such reference voltage is reduced to a normal value in the late charging condition, that is, as the battery nears its charged condition, to perform ordinary charging of battery 2. To this end, in accordance with this invention, an AC component detecting circuit 4 is provided to determine the variable reference voltage in view of the fact that the AC component of the charging current is relatively large in the initial charging condition and relatively small in the late charging condition. The AC component detecting circuit 4 is shown to include a transistor $Q_3$ for amplification and a transistor $Q_4$ for rectifying. The transistor $Q_3$ is supplied, at its base electrode, with the AC component of the charging current, that is, the hatched portions of the pulsating voltage $S_a$ (FIG. 2A), through a capacitor $C_1$ and a variable resistor $R_1$ connected in series. The output signal from transistor $Q_3$ is rectified by transistor $Q_4$ so that a DC voltage, which is proportional to the AC component, is obtained across a capacitor $C_2$ connected in parallel to an emitter resistor $R_{10}$ of transistor $Q_4$. In the illustrated example, the capacitor $C_1$ is connected to the positive terminal of battery 2 to detect the terminal voltage thereof. The thus detected terminal voltage of battery 2 is similar to the pulsating voltage $S_a$ during the charging period $T_1$ and proportional to the charging current, so that, for practical purposes, it can be considered as representative of the charging current. In the battery charger in accordance with this invention, a pulse forming circuit 3 is also provided for detecting the terminal voltage of the battery 2 during each non-charging period. The pulse forming circuit 3 is mainly composed of a transistor $Q_2$ which is connected at its collector electrode to the positive terminal of battery 2 and at its base electrode to the pulsating current power supply 1. From the collector electrode of transistor $Q_2$ there is derived a pulse train $S_b$ (FIG. 2B), each pulse of which has a relatively narrow pulse width $t_1$. A pulse of the pulse train $S_b$ is obtained each time the level of the pulsating voltage $S_a$ is lowered, that is, at every non-charging period $T_2$, and the peak value of each pulse is equal to the voltage of the battery 2 at the non-charging period. The pulse train $S_b$ is fed through a diode, for preventing a back flow, to the base electrode of a transistor $Q_5$ which is included in a level detecting circuit 5.

The level detecting circuit 5 consists of a Schmitt circuit composed of the transistor $Q_5$ and a transistor $Q_6$ which are alternately conductive, that is, for example, when transistor $Q_5$ is made non-conductive the other transistor $Q_6$ is conductive. During the time period when the peak value of each pulse of train pulse $S_b$ is low, that is, in the initial charging condition, the transistor $Q_5$ is kept non-conductive by a bias voltage from the connection point between a variable resistor $R_3$ and a thermistor $R_4$ of a base-bleeder which further includes a resistor $R_5$. As the terminal voltage of the battery 2 is gradually increased by charging, the peak voltage of each pulse of pulse train $S_b$ from the pulse forming circuit 3 also increases. When the peak voltage of the pulses of pulse train $S_b$ arrives at a reference voltage which, in the illustrated embodiment, is the emitter potential of transistor $Q_5$, the transistor $Q_5$ starts its ON-OFF operation in synchronism with the pulse train $S_b$ and the other transistor $Q_6$ also starts its OFF-ON operation. The period of the ON-OFF operation coincides with that of the pulsating voltage $S_a$ and hence a pulse train $S_e$ (FIG. 2E), each pulse of which has a pulse width $t_1$ equal to that of the pulse $S_b$, is obtained as an output of transistor $Q_6$, that is, as an output of the level detecting circuit 5. The pulse train $S_e$ is applied to a diode $D_2$ through a first differentiation circuit consisting of a capacitor $C_3$ and a resistor $R_7$. The output of diode $D_2$, which is a differentiated negative going pulse $S_f$ (FIG. 2F) with a pulse width $t_2$ narrower than the pulse width $t_1$ of the pulse $S_b$, is applied to the base electrode of a transistor $Q_8$ which, with another transistor $Q_9$, constitutes a flip-flop circuit 6.

A common emitter resistor $R_6$ for the transistors $Q_5$ and $Q_6$ within level detecting circuit 5 is supplied with the DC voltage across capacitor $C_2$ of AC component detecting circuit 4 through a variable resistor $R_2$ and a diode $D_1$ connected in series. Since the DC voltage across capacitor $C_2$ is large in the initial charging condition, but becomes relatively small in the later charging condition, that is, as the battery nears its charged state, the emitter potential of transistor $Q_5$ is high, and hence commencement of ON-OFF operation of transistor $Q_5$ is suppressed, in the initial charging condition. Therefore, the starting time $T_o$ (FIG. 2F) of the ON-OFF operation is retarded until relatively late in the charging operation.

A pulse $S_d$ (FIG. 2D), which is the output from flip-flop circuit 6, is fed to a control circuit 7 for the switching element $Q_1$, which control circuit is shown to consist mainly of a transistor $Q_7$. When transistor $Q_7$ is non-conductive, switching transistor $Q_1$ is conductive and, conversely, when transistor $Q_7$ is conductive, transistor $Q_1$ is non-conductive. Accordingly, if the output pulse $S_d$ of flip-flop circuit 6 is ⌈0⌋, transistor $Q_7$ is made non-conductive and hence transistor $Q_1$ is conductive. On the other hand, if the pulse $S_d$ is ⌈1⌋, transistor $Q_7$ is made conductive and hence transistor $Q_1$ is non-conductive. The period when the switching element $Q_1$ is made conductive is the charging period $T_1$ and during this period battery 2 is being charged.

The transistor $Q_8$ of flip-flop circuit 6 is supplied with the differentiated pulse $S_f$ at its base electrode, and the other transistor $Q_9$ of flip-flop circuit 6 is supplied, at its base electrode, with a differentiated pulse $S_c$ (FIG. 2C) which is obtained by applying the pulse $S_b$ from pulse forming circuit 3 to a second differentiation circuit consisting of a capacitor $C_4$ and a resistor $R_9$. The positive and negative trigger pulses of the differentiated pulse $S_c$ trigger transistor $Q_9$ to its ON and OFF states, respectively, and hence the other transistor $Q_8$ is similarly disposed in its OFF and ON states, respectively, in accordance with the positive and negative trigger pulses of differentiated pulse $S_c$. Accordingly, the pulse $S_d$, with the same pulse width $t_1$ as pulse $S_b$, is derived from the collector electrode of transistor $Q_8$ in flip-flop circuit 6 and then fed to the base electrode of transistor $Q_7$ in control circuit 7. However, as the charging of battery 2 proceeds, and hence the charging current decreases, the reference voltage across resistor $R_6$ of level detecting circuit 5 decreases with the result that the level detecting circuit 5 starts its operation, for example, at the time point $T_o$, to deliver the pulse $S_e$. As level detecting circuit 5 delivers the pulse $S_e$, the negative differentiated pulse $S_f$ is applied to the base electrode of transistor $Q_8$ at every period of the pulsating current after the time $T_o$ to make transistor $Q_8$ non-conductive, so that flip-flop circuit 6 delivers a pulse $S'_d$ (FIG. 2D) which is ⌈0⌋ during the period $t_2$ in which the pulse $S_f$ is applied, and ⌈1⌋ at other times. Accordingly, after the time $T_o$, switching element $Q_1$ is kept non-conductive to practically stop the charging of battery 2.

It will be apparent that, with the above described battery charger according to this invention, a charging current is applied to the battery to be charged from a pulsating current power source; the charging current to the battery is controlled in accordance with the open terminal voltage of the battery which is detected during a non-charging period; a reference voltage is varied with the detected AC component of the charging current; and, in an initial charging condition, charging is carried out with a charging current greater than a nominal value as a result of the reference voltage being relatively large, but, in a late charging condition, a normal current charging is applied to the battery and the terminal voltage of the battery is compared with a normal or reduced reference voltage, as mentioned above. Accordingly, it will be understood that quick charging of the battery can be achieved without the risk of over charging.

Further, in accordance with this invention, the switching element $Q_1$ is controlled by the flip-flop circuit 6, so that even if the frequency of the power supply varies, the operation of flip-flop circuit 6 follows the frequency of the power supply, and hence the switching element $Q_1$ can be positively held in its ON-state during each charging period of the pulsating current irrespective of the frequency of the power supply. Accordingly, the battery charger embodying this invention is characterized by stable operation.

It will also be seen that, with the battery charger according to this invention, the open terminal voltage of the battery is detected by the Schmitt circuit of circuit 5, but the input voltage constituted by the pulse $S_b$, is applied to the base electrode of transistor $Q_5$, so that the input signal is delivered to the outside of the hysteresis loop of the Schmitt circuit at every operation of that circuit. As a result, the input signal is not affected by the hysteresis of the Schmitt circuit. In other words, the Schmitt circuit can accurately correspond to a slight variation of the terminal voltage of the battery for positively controlling the charging of the battery.

In the illustrated embodiment of the invention, a voltage impressed on the battery, that is, the hatched portions of pulsating voltage $S_a$, is detected so as to detect the AC component of the charging current. However, it is apparent that a resistive element may be inserted in the charging current loop in series therewith, and then the voltage produced across such resistive element may be detected with the same effect.

Although an illustrative embodiment of the invention has been described in detail herein with reference to the accompanying drawing, it is to be understood that the invention is not limited to that precise embodiment, and that various changes and modifications may be effected therein by one skilled in the art without departing from the scope or spirit of this invention.

What is claimed is:

1. A battery charger comprising:
   power supply means including an AC power source and rectifier means for producing voltage pulses,
   switching means connected to said power supply means in series with a battery to be charged and having conductive and non-conductive states for supplying a charging current to the battery only when said switching means is in said conductive state,
   control circuit means connected to said switching means for normally disposing said switching means in said conductive state during charging periods of said voltage pulses when the voltage of the latter exceeds the terminal voltage of the battery and in said non-conductive state during intervals between said charging periods,
   level detecting circuit means connected to said control circuit means and including means for detecting the terminal voltage of the battery in said intervals between the charging periods of said voltage pulses and means for comparing the detected terminal voltage with a reference voltage and providing an output to said control circuit means for shifting said switching means to said non-conductive state thereof during said charging periods in response to said detected terminal voltage rising to a level having a predetermined relation to said reference voltage, and
   reference voltage control means including means for detecting the AC component of said charging current for the battery during said charging periods, and means establishing said reference voltage in correspondence with the detected AC component for varying said reference voltage from a relatively large value at the commencement of the charging of said battery to effect initial rapid charging with a high charging current, to a relatively lower value as charging of the battery proceeds to complete the charging with a relatively reduced charging current.

2. A battery charger according to claim 1, wherein said switching means includes a switching semiconductor element.

3. A battery charger according to claim 1, wherein said level detecting circuit means includes a Schmitt circuit.

4. A battery charger comprising:
   pulsating current power supply means including an AC power source and rectifier means,
   switching means connected to said power supply means in series with a battery to be charged,
   control circuit means connected to said switching means for controlling the charging current for the battery through said switching means,
   level detecting circuit means connected to said control circuit means for detecting a voltage of the battery by comparing the same with a reference voltage intermittently in synchronism with a period of said AC power source and providing a corresponding output controlling said switching means, and
   reference voltage control means including means for detecting the AC component of said charging current for the battery and means for varying said reference voltage in correspondence with the detected AC component so that said reference voltage, at the commencement of the charging of said battery, has a relatively large value to effect initial rapid charging with a high charging current and the reference voltage is reduced as charging of the battery proceeds to complete the charging with a relatively reduced charging current, and
   wherein said control circuit means includes a flip-flop circuit which is triggered in synchronism with a period of said AC power source.

* * * * *